United States Patent [19]

Hurkett

[11] 4,011,858
[45] Mar. 15, 1977

[54] SOLAR CONCENTRATOR

[76] Inventor: Earl R. Hurkett, 311 W. Platte, Fort Morgan, Colo. 80701

[22] Filed: Feb. 9, 1976

[21] Appl. No.: 656,648

[52] U.S. Cl. ............................................. 126/271
[51] Int. Cl.² .......................................... F24J 3/02
[58] Field of Search ........... 126/270, 271; 237/1 A; 60/641; 350/293, 299

[56] References Cited

UNITED STATES PATENTS

| 1,345,758 | 7/1920 | Folsom | 126/271 |
| 1,855,815 | 4/1932 | Abbot | 126/271 |
| 2,247,830 | 7/1941 | Abbot | 126/271 |
| 3,363,328 | 1/1968 | Dickens et al. | 34/124 |
| 3,847,136 | 11/1974 | Salvail | 126/271 |

FOREIGN PATENTS OR APPLICATIONS 512,526  10/1920   France ............................ 126/271

*Primary Examiner*—Kenneth W. Sprague
*Assistant Examiner*—James C. Yeung

[57] ABSTRACT

An apparatus for collecting solar energy, the apparatus including a parabola shaped reflector around a pipe enclosed in a glass tube, the pipe being located at the focal point of the parabola shaped reflector, so that sunlight rays are reflected thereagainst, so to concentrate their heat thereagainst, the pipe extending outwardly of opposite ends of the reflector, so that water passing through the pipe is thus heated for practical uses, and the reflector being rotatable, so to follow the path of the sun, in order to obtain maximum efficiency therefrom.

2 Claims, 4 Drawing Figures

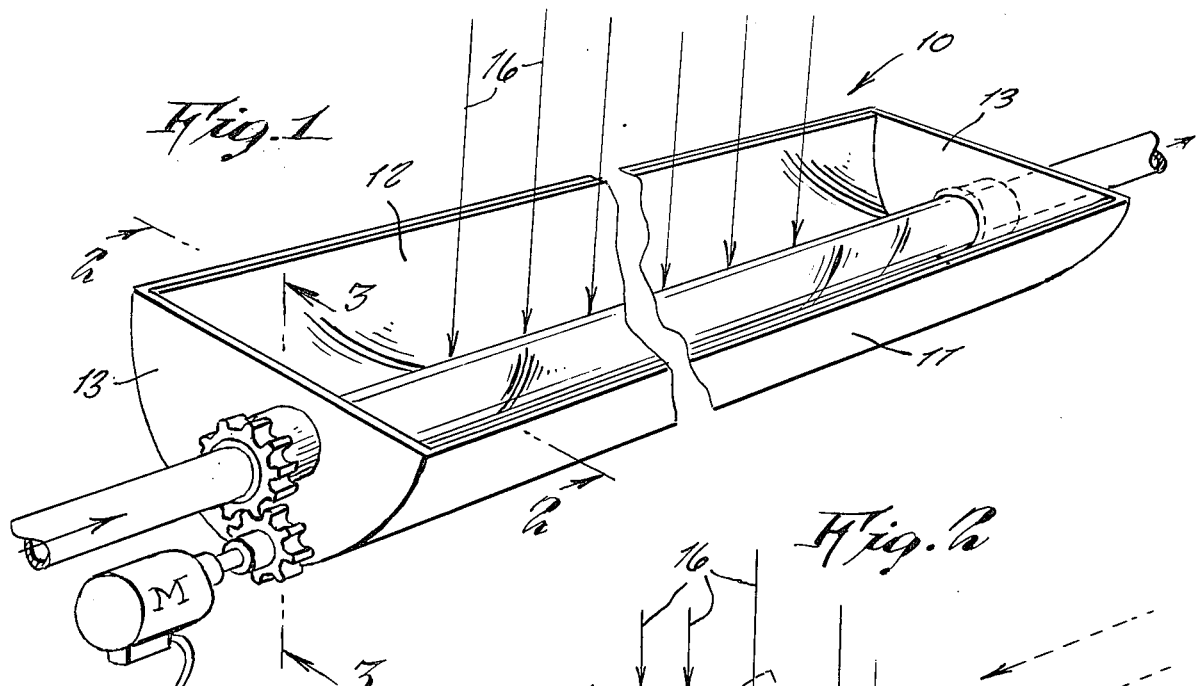
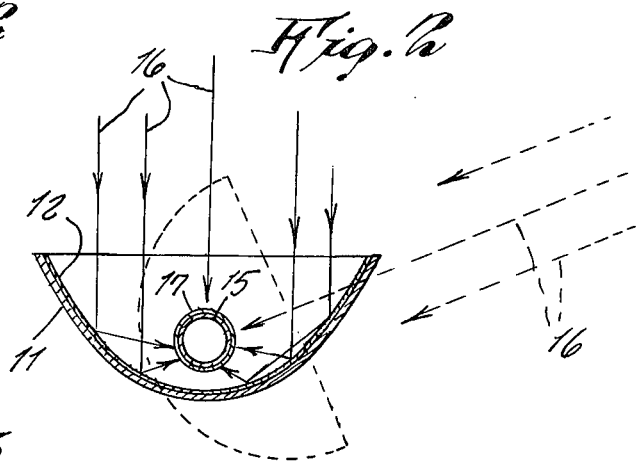
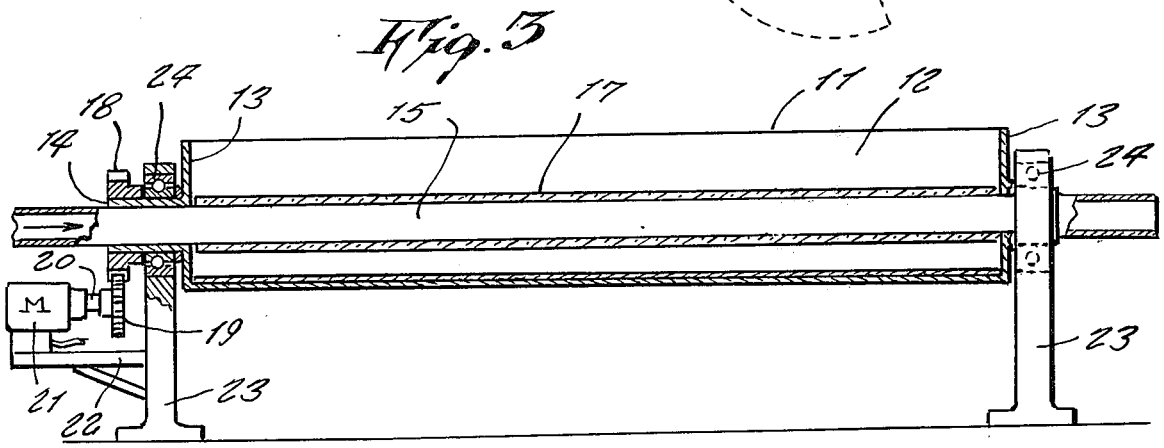
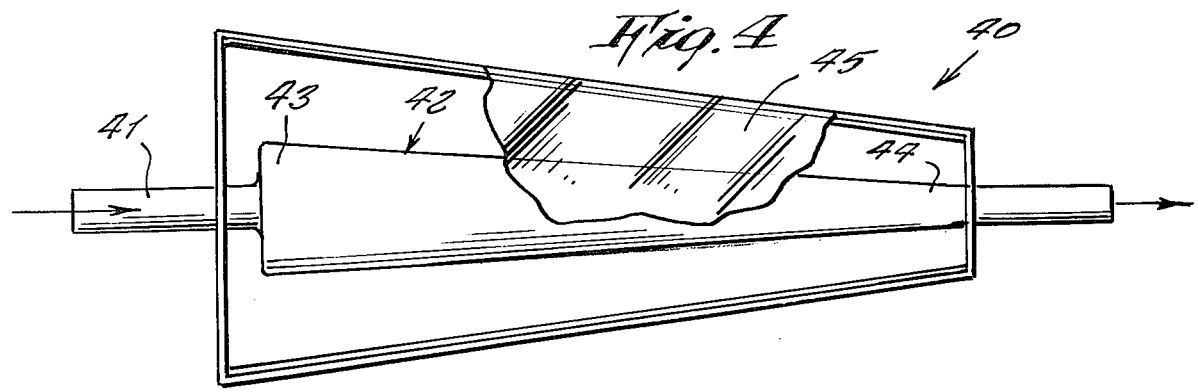

SOLAR CONCENTRATOR

This invention relates generally to solar heat collectors.

A principal object of the present invention is to provide a solar concentrator which continually moves, so to follow the position of the sun, in order that a maximum amount of the sunlight rays are gathered therein, thereby differing from old, conventional solar collectors having stationary flat plates, which, accordingly, do not face the sun at all times.

Another object of the present invention is to provide a solar concentrator through which water circulates, so that the water can thus become heated, in order to be used, such as heating of a house, or the like.

Still another object of the present invention is to provide a solar concentrator which can be used to superheat vapor which could be shot through turbines in order to produce electrical power.

Still another object is to provide a solar concentrator which requires less collector area to heat a particular building as compared to an area required for a flat plate solar collector, such as used heretofore.

Other objects are to provide a solar concentrator which is simple in design, inexpensive to manufacture, rugged in construction, easy to use and efficient in operation.

These and other objects will be readily evident upon a study of the following specification and accompanying drawing, wherein:

FIG. 1 is a perspective view of the present invention;

FIG. 2 is a transverse cross sectional view thereof, taken on line 2—2 of FIG. 1;

FIG. 3 is a cross sectional view taken on line 3—3 of FIG. 1;

FIG. 4 is a top plan view of a modified design of the invention, and which incorporates a structure for effectively heating a maximum amount of water passing through the solar concentrator.

Referring now the drawing in greater detail, and more particularly to FIGS. 1 through 3 thereof at this time, the reference numeral 10 represents a solar concentrator, according to the present invention, wherein there is a reflector 11 of elongated character, and which is of parabola cross sectional shape, as is evident in FIG. 2, the reflector being open upon its upper side, the inside surface of the reflector being coated with a reflective material 12.

The opposite ends of the reflector 11 include opposite end walls 13, each one of which is integral with an outwardly extending sleeve 14, fitted around a metal pipe 15 that extends through the solar concentrator, and through both sleeves which are axially aligned. As clearly shown in FIG. 2, it is to be noted that the pipe runs along the axis of the focal point of the parabola shaped reflector, so that light rays 16, from the sun shining against the reflective surface 12, of the reflector, are directed toward the pipe 15. A glass tube 17 is fitted around the outer side of the pipe.

A gear 18 is fixedly secured to one of the sleeves 14, the gear 18 being engaged toothingly with a gear 19 mounted upon a shaft 20 of an electric motor 21. The motor is mounted upon a shelf 22, integral with a stanchion 23, which, at its upper end, supports a bearing 24, within which the sleeve 14 is supported, in order to rotate relatively friction-free. The opposite end of the solar concentrator likewise includes the above described stanchion 23, supporting the bearing 24, for supporting the sleeve of the end wall 13.

In operative use, it is now evident that the reflector can thus be automatically turned, in order to face the sun position, if the motor is activated by a switch controlled by the sun position. Thus, a water traveling through the pipe 15 can be heated within the pipe portion that extends within the solar concentrator, so that the water can be utilized for heating purposes.

Reference is now made to FIG. 4 of the drawing, wherein a modified design of solar concentrator 40 is generally similar to the above described solar concentrator 10, except that in the present modified design of solar concentrator 40 there is a pipe 41 extending through the concentrator, and which is diametrically enlarged along its portion that is located within the concentrator. The diametrically enlarged portion 42, of the pipe 41, is shown to be of generally conical shape, and having its largest diameter 43 located at the end where the cold water enters the pipe portion 42. Thus a large quantity of water is initially permitted to enter the interior of the solar concentrator so that it can remain a relatively long time within the concentrator before being moved outwardly therefrom. The opposite end of the pipe portion 42 is of narrow diameter, as shown at 44, so that water within this portion of the pipe thus becomes maximum heated to a very hot temperature, before leaving the concentrator.

The top of the solar concentrator is closed by a clear glass 45, so that radiant heat, within the interior of the solar concentrator, cannot rise outwardly and escape, the radiant heat thus serving as an additional heat source for heating the pipe to a more hot temperature.

Thus a modified design is provided.

While various changes may be made in the detail construction, it is understood that such changes will be within the spirit and scope of the present invention, as is defined by the appended claims.

What I now claim is:

1. A solar concentrator, comprising in combination, an elongated reflector, which is a parabola cross-sectional shape, a reflective material on an inner surface of said reflector, a pipe extending along a longitudinal axis of said reflector and being located along a focal point of said reflector, and means for rotating said reflector in order to follow a path of the sun; said pipe having a portion thereof extending within said reflector, a glass tube enclosing said portion, an outwardly extending sleeve integral with each end wall of said reflector, said sleeves being axially aligned, said pipe extending through said sleeves, said sleeves being supported within bearings mounted in stanchions stationarily placed upon a supporting surface, one said sleeve having a gear secured thereto, said gear engaging a gear mounted on a shaft of an electric motor, and a portion of said pipe contained within said reflector being diametrically enlarged at one end, said pipe portion, accordingly, being conical in configuration, said diametrically enlarged end of said pipe portion being located adjacent an end of said pipe that forms an entry for cold water passing through said pipe.

2. The combination as set forth in claim 1, wherein a clear glass encloses a top of said reflector, said glass holding radiant heat from escaping upwardly out of said reflector.

* * * * *